United States Patent
Henry et al.

(10) Patent No.: US 7,261,842 B2
(45) Date of Patent: Aug. 28, 2007

(54) PHOTOCHROMIC COMPOSITIONS, PREPARATION THEREOF AND ARTICLES MADE THEREFROM OR COATED THEREWITH

(75) Inventors: David Henry, Morigny-Champigny (FR); Cecile Lecrivain, Fontenay-sous-Bois (FR)

(73) Assignee: Corning Incorporated, Corning, NY (US)

( * ) Notice: Subject to any disclaimer, the term of this patent is extended or adjusted under 35 U.S.C. 154(b) by 434 days.

(21) Appl. No.: 10/393,849

(22) Filed: Mar. 21, 2003

(65) Prior Publication Data

US 2003/0193044 A1 Oct. 16, 2003

(30) Foreign Application Priority Data

Apr. 17, 2002 (FR) ................... 02 04778

(51) Int. Cl.
*G03C 1/685* (2006.01)
*G03C 1/73* (2006.01)
*C08G 18/67* (2006.01)
*C08G 18/00* (2006.01)
*C09D 175/14* (2006.01)

(52) U.S. Cl. ............. 252/586; 252/589; 252/582; 252/182.11; 524/590; 524/589; 524/94; 524/95; 524/104; 524/110

(58) Field of Classification Search .......... 252/586
See application file for complete search history.

(56) References Cited

U.S. PATENT DOCUMENTS

| 4,028,118 | A | * | 6/1977 | Nakasuji et al. ......... 106/31.19 |
| 4,387,139 | A | | 6/1983 | Herwig et al. |
| 4,399,239 | A | | 8/1983 | Herwig et al. |
| 4,694,090 | A | * | 9/1987 | Shiono et al. ............. 549/407 |
| 6,166,129 | A | | 12/2000 | Rosthauser et al. |
| 6,531,076 | B2 | | 3/2003 | Crano, deceased et al. . 252/286 |
| 6,638,635 | B2 | * | 10/2003 | Hattori et al. ............. 428/500 |
| 6,811,945 | B2 | * | 11/2004 | Kobayashi ................. 430/199 |
| 6,830,861 | B2 | * | 12/2004 | Takashima et al. ......... 430/138 |

FOREIGN PATENT DOCUMENTS

| EP | 0 048 913 | 9/1981 |
| EP | 0 294 056 | 5/1988 |
| FR | 2 728 576 | 12/1994 |

* cited by examiner

*Primary Examiner*—Joseph D. Anthony
(74) *Attorney, Agent, or Firm*—Siwen Chen; Robert P. Santandrea

(57) ABSTRACT

The present invention relates to novel cross-linkable or crosslinked photochromic compositions, articles made from or coated with the compositions and method of making the compositions. The compositions contain (i) at least one segmented or non-segmented polyurethane-type or polyurethane-urea-type linear polymer having at least one non-terminal moiety that comprises at least one unsaturated group; and (ii) an effective amount of at least one photochromic organic compound, advantageously selected from spiroxazines, chromenes, spiropyrans fulgides and fulgimides.

20 Claims, No Drawings

PHOTOCHROMIC COMPOSITIONS, PREPARATION THEREOF AND ARTICLES MADE THEREFROM OR COATED THEREWITH

FIELD OF THE INVENTION

The present invention relates to:
cross-linkable photochromic compositions;
cross-linked photochromic compositions, which are obtainable from said novel cross-linkable photochromic compositions;
articles made from or coated with the photochromic compositions, in particular, photochromic lenses based on these novel cross-linked compositions; and
a method of preparing these novel cross-linkable photochromic compositions.

BACKGROUND OF THE INVENTION

Photochromism, which is expressed by various types of photochromic organic molecules, which are accepted into a host organic material, is a known phenomenon which is widely described in the literature.

Within a polymer matrix, the mobility of the polymer chains in the vicinity of the photochromic molecules defines the speed at which the photochromic properties of said molecules are expressed, insofar as the reversible change in colour of said molecules is based upon a reversible process of ring cleavage and isomerisation. Consequently, the process of darkening and fading of a polymer matrix, the host of the photochromic molecules, is dependent upon the free volume left, in said matrix, to said molecules and therefore, upon the flexibility of the polymer chains of said matrix.

From this point of view, the polyurethane or polyurethane-urea matrices are particularly interesting. The free volume within them can in fact easily be adjusted by a careful choice of the blocks assembled during the synthesis. Thus, the colouration and the return to the initial colour of a polyurethane or polyurethane-urea matrix can thus be optimised by an appropriate choice of the blocks incorporated during the synthesis of said matrix.

Furthermore, the use of photochromic coatings on non-photochromic matrices, instead of and in the place of matrices which are rendered photochromic throughout their whole mass, is opportune when said non-photochromic matrices do not offer a flexibility which is sufficient, a free volume which is sufficient, for the expression of the photochromism of molecules accepted within them. Thus, thermoplastic materials, such as polymethylmethacrylate or polycarbonates are not suitable as a host polymer of photochromic molecules insofar as the free volume within them and the flexibility of the chains constituting them are insufficient.

Patent application EP-A-0 294 056 describes the preparation of photochromic polyurethanes. Said polyurethanes are prepared, classically, from diisocyanate reagents and polyol reagents. The photochromic compound is added, prior to the reaction, with one of the reagents or in the mixture of reagents. The isocyanate groups being very reactive groups, the mixture of the reagents made up cannot be preserved. It must be made to react, immediately after its preparation. This constitutes a severe constraint with regard to the implementation of the process.

Additionally, if the isocyanate groups subsist within the polyurethane matrix prepared, they may generate, in the presence of moisture, (during the later use of said matrix), amines. Such amines are capable themselves of destabilising, even of destroying, certain photochromic compounds, which are present in the matrix (chromenes, in particular).

The U.S. Pat. No. 6,187,444 describes photochromic polyurethane coatings which are obtained by a synthesis process, which is exonerated by the constraint set forth above. The reactivity of the mixture of reagents—isocyanate/polyol—is in fact controlled insofar as blocked isocyanates are used. Their NCO functions are, classically, blocked with the aid of suitable organic compounds. When brought to a sufficient temperature—generally between 90 and 200° C.—the blocked isocyanates release the blocking compound and thus are isocyanates which are free to react with the polyols which are present, in order to generate the polyurethane sought after.

Unfortunately, as mentioned in this US patent, it is, in general, not possible to remove all the blocking compounds. Thus, an excess of blocked isocyanates must always be provided in order to ensure the presence of a given amount of free (unblocked) isocyanates. Such an excess of isocyanate is particularly unsuitable in a material which contains photochromic compounds. It has been seen above that the isocyanates can be hydrolysed into amines, and these amines are capable of destabilising, and of destroying, such photochromic compounds (more particular those of the chromene type).

Furthermore, during the synthesis of such coatings, notably of a significant thickness, it is not excluded to trap the blocking compounds. It is even possible, in certain cases, to observe the formation of bubbles on the surface of the coating.

The application WO-A-01 55 269 also describes photochromic polyurethane coatings.

One of the drawbacks of the classical polyurethanes is that they are quasi-biphasic with an ordered structure. Said polyurethanes in fact contain soft segments, which are entirely mobile, and which are present in the form of balls, and rigid oligourethane units, which are known as hard segments. The cohesion of these polyurethanes is mainly due to the hydrogen bonds which exist between the urethane groups, of high polarity, which are present in the hard segments. Consequently, it may be feared that the photochromic compounds which are localised in said hard segments suffer from a lack of mobility and therefore that the rates of darkening and of fading of the material in question be slowed down.

To this day, one has not any photochromic polyurethanes at ones disposal which are very efficient and which are easy to obtain.

The application WO-A-01 02 449 describes a photochromic coating, of poly(meth)acrylic type, which is obtained by copolymerisation of a mixture of (meth)acrylic monomers which contains photochromic molecules. Said mixture of monomers, which is not very viscous, does not enable coatings to be generated which are of a thickness sufficient in order to exhibit good photochromic properties, at a reasonable cost. In fact, in order to compensate for the low thickness of the coating, it is necessary that the photochromic compound be incorporated at a high concentration, and this sometimes poses a problem, in view of the solubility of said compound in said coating.

SUMMARY OF THE INVENTION

In such a context, novel cross-linkable photochromic compositions, in accordance with the invention, are proposed which are precursors of polyurethane or polyurethane urea photochromic coatings, which are particularly interesting, with reference to the problems encountered in the prior art, as set forth above:

the problem of the potential presence of amines;
the problem of the ordered structure; and
the problem of the sufficient thickness of the coatings sought after.

Said novel cross-linkable photochromic compositions of the invention contain:

at least one segmented or non-segmented polyurethane-type or polyurethane-urea-type linear polymer having at least one non-terminal moiety that comprises at least one unsaturated group; and an effective amount of at least one photochromic organic compound.

Characteristically, they contain a certain type of linear polyurethane or linear polyurethane-urea, with unsaturated group(s), which is pre-constituted and which has been synthesised beforehand, by a classical reaction, in the absence of any photochromic compound. Said photochromic compound(s) is (are) incorporated later on, after the synthesis of said polyurethane or polyurethane-urea. Thus, it has been possible, beforehand, to make all the isocyanate groups react and to prevent any further formation of an amine group, which can destabilise, or destroy said photochromic compound(s).

The linear polyurethane or polyurethane-urea which is used is however susceptible to being further cross-linked—on itself or with a suitable partner (see further on)—in order to generate a suitable matrix within which the photochromic compound(s) which is (are) present will be trapped, insofar as it has at least one unsaturated group in the molecule. Such an unsaturated group, within at least one non-terminal moiety, does not in any way exclude the presence of unsaturated group in the terminal moieties.

The cross-linking, which involves the unsaturated groups of the polyurethane or polyurethane-urea chain, is implemented radically, in order to generate carbon-carbon bonds. It is in no way at all prejudicial to the photochromic compound(s) present.

The unsaturated groups in question are advantageously of (meth)acrylic type (i.e., acrylic or methacrylic).

The unsaturated groups in question are advantageously present within the pendant groups. It is not excluded that they are incorporated in the skeleton of said chain but, advantageously, they are incorporated within pendant groups, which are attached to said skeleton.

The photochromic organic compound which is incorporated, alone or in a mixture, is advantageously selected from spiroxazines, chromenes, spiropyrans, fulgides and fulgimides. The joint incorporation of such compounds is more particularly preferred, such compounds being able to generate a grey or brown tint.

Said compounds are incorporated in an effective amount, able to confer the desired tint to the matrix obtained by cross-linking of the composition. Said effective amount is generally between 0.1 and 20% by weight.

The present invention also provides articles made from or coated with the crosslinkable or crosslinked photochromic composition of the present invention.

The present invention further provides a method for preparing the crosslinkable or crosslinked photochromic composition. The method comprises mixing the following:

at least one polyurethane-type or polyurethane-urea-type linear polymer having at least one non-terminal moiety that comprises at least one unsaturated group;

an effective amount of at least one photochromic organic compound;

optionally, at least one additional unsaturated monomer;
optionally, an effective amount of at least one radical polymerisation initiator; and
optionally, an effective amount of an inert solvent.

DETAILED DESCRIPTION OF THE INVENTION

It is now proposed to specify, in a manner which is not at all limiting, the nature of the unsaturated polyurethane-type or polyurethane-urea-type linear polymer, which constitutes the basic element of the cross-linkable photochromic compositions of the invention, as well as the means of obtaining said polymer.

Said polymer results advantageously from a reaction of at least one diol bearing at least one unsaturated group, and of at least one diisocyanate (polyurethane polymer); or from a reaction of at least one diol bearing at least one unsaturated group, of at least one diisocyanate and of at least one diamine (polyurethane-urea polymer).

The reagents in question, which are classical per se for the synthesis of a polyurethane or of a polyurethane-urea, are selected to be difunctional, for the preparation of such a linear polyurethane or polyurethane-urea.

Within the context of the advantageous variant specified above, the unsaturated group(s) sought after is (are) brought about by the diol(s) which is (are) used. Thus, the diol(s) which is (are) used contain(s) advantageously at least one (meth)acrylic group in its (their) structure. Such diols exist on the market.

It is not excluded from the context of the present invention that the unsaturated group(s) sought after be brought about by the diisocyanate(s) which is (are) incorporated, even by the diol(s) and the diisocyanate(s) which is (are) incorporated.

The nature of such diols, which are unsaturated, and which can be used for the prior synthesis of linear polyurethanes or polyurethane-ureas, is specified below in a manner which is in no way limiting. Advantageously, these are unsaturated diols, which have a short chain, and which are of the general formula (I) below:

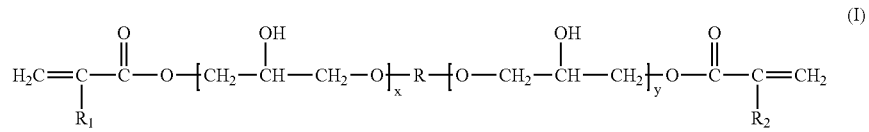

in which:

R is a bivalent linking group selected from
C$_2$-C$_{14}$ alkylene groups,
polyalkylene oxide groups which are able to comprise up to 17 carbon atoms,
phenylene groups, which are non-substituted or substituted with C$_1$-C$_9$ alkyls,

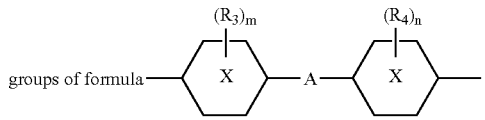

in which X is a phenylene or cyclohexyl group;
A is O, S, SO$_2$, —CH$_2$—, —C(CH$_3$)$_2$— or —C(CH$_3$)(C$_6$H$_5$); R$_3$ and R$_4$ independently represent a C$_1$-C$_4$ alkyl group, a halogen, advantageously chlorine or bromine; m and n are, independently, integers from 0 to 4;
R$_1$ and R$_2$ represent, independently, hydrogen or a methyl group;
x and y are integers from 0 to 2, the sum x+y being equal to 2.

Preferred diols of formula (I) are those of formulae (Ia) and (Ib) below:

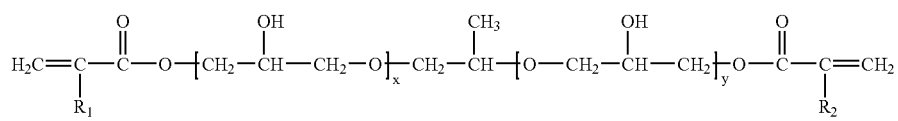

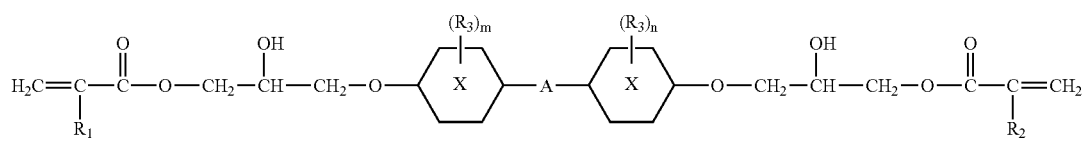

Those of formula (Ib) are particularly preferred. Amongst these, those of formula (Ib$_1$) below are more particularly preferred:

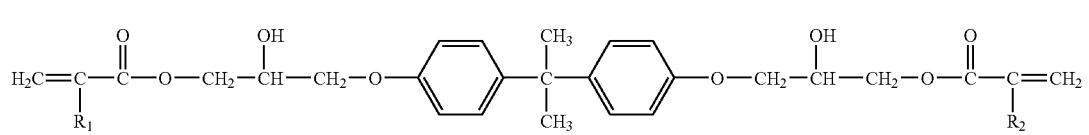

That of said formula (Ib$_1$) in which R$_1$=R$_2$=H is that the use of which is more particularly recommended. It is known under the designation BAGDA (Bisphenol A Glycerolate DiAcrylate).

The person skilled in the art cannot be unaware that within the structure of traditional polyurethanes and polurethane-ureas, the soft segments/hard segments ratios determine the photochromic properties.

By using unsaturated, short chain diols, of the types specified above, into said structure, one has a priori an additional parameter at one's disposal in order to influence said photochromic properties. The network may a priori be disorganised and the hardness classically conferred by the hard segments can be decreased, in making their unsaturated groups react with each other or with a cross-linking partner.

The inventors do in fact believe that the cross-linking which develops on the unsaturated groups of the hard segments (during the cross-linking of the cross-linkable compositions) will create heterogeneities and will break the classical ordered structure.

The following may be specified with reference to the diisocyanates, which are used for the prior synthesis of the unsaturated, linear polyurethanes or polyurethane-ureas. They are advantageously selected from (cyclo)aliphatic diisocyanates (aliphatic and cycloaliphatic). The use of aromatic diisocyanates is not excluded, but with the (cyclo) aliphatic diisocyanates, the yellowing of the compositions obtained by cross-linking of the unsaturated linear polyurethanes prepared from said (cyclo)aliphatic diisocyanates is avoided in a more reliable manner. For the preparation of said unsaturated linear polyurethanes, the use, alone or in a mixture, of the following diisocyanates is more particularly recommended: dicyclohexylmethane diisocyanate, isophorone diisocyanate, hexamethylene diisocyanate, tetramethylxylene diisocyanate and tolylene diisocyanate.

Mention has been made above of the eventual incorporation of unsaturated diisocyanates. Such unsaturated diisocyanates were notably described in "Chemistry and technology of isocyanates, Henry Ulrich, John Wiley & Sons, p.149-151". Preferably, within the context of the present invention, unsaturated diisocyanates which bear acrylate functions are used, such as that marketed by the company BAYER, under the designation ROSKYDAL UAVPLS2337.

The diamines which can be used for the prior synthesis of the polyurethane-ureas, can be short chain diamines (molar mass<500) or long chain diamines (molar mass≧500). Their nature is selected as a function of the mechanical properties desired for the polyurethane-urea polymer sought after. The joint use of at least one short chain diamine and of at least one long chain diamine is not excluded.

Polyether diamines, such as those marketed by the company Huntsman Corp. under the designation Jeffamine® Polyoxyalkylene diamines, can notably be incorporated as long chain diamines. These diamines contain primary amine groups at the extremities of a polyether chain. The polyether chain is based on either propylene oxide (PO) moieties, or on ethylene oxide (EO) moieties, or on propylene oxide and ethylene oxide moieties (PO/EO). The following may be cited as examples of such polyether diamines:

+ polyethylene glycol terminated on its two extremities by a 3-aminopropyl group;

+ polypropylene glycol terminated at its two extremities by a 2-aminopropylether group;

+ a polypropylene glycol-polyethylene glycol-polypropylene glycol block copolymer terminated at its two extremities with a 2-aminopropylether group.

As such long chain diamines, those the molar mass of which is between 600 and 2,000 are more particularly preferred.

As short chain diamines, aliphatic diamines, polyether diamines of low molar mass (<500) and aromatic diamines, can notably be incorporated.

The following is cited, in a manner which is in no way limiting:

as such aliphatic diamines: ethylenediamine, propanediamine, butanediamine, pentanediamine, hexanediamine, piperazine, 2,5-dimethylpiperazine, bis(aminocyclohexylmethane);

as such polyether diamines: polypropylene glycol terminated at its two extremities by a 2-aminopropylether group, the molar mass of which is between 230 and 400;

as such aromatic diamines: that derived from diaminodiphenylmethane, m-phenylenediamine. Diethyltoluenediamine can also be used. This molecule is well known as a chain extension moiety of polyurethane-ureas.

According to a first variant, the unsaturated, linear polyurethanes or polyurethane-ureas in question are non-segmented polymers. They result from the classical reaction of at least one diisocyanate, of at least one diol and eventually of at least one diamine; one sole diol or several diols of the same type, with reference to their chain length, one sole diamine or several diamines of said same type, with reference to their chain length.

Advantageously, within the context of this first variant, the diol(s) which is (are) incorporated is (are) short chain diols. Very advantageously, said unsaturated, short chain diols are of formulae (I), (Ia), (Ib) or (Ib$_1$) specified above.

Such short chain, unsaturated diols are entirely capable of being incorporated in a mixture with other short chain diols, which do not bear any unsaturated group and/or with diamines, which do not bear any unsaturated group (for the preparation of polyurethane-ureas).

The nature of the diamines which can be used has been specified above. In the present context (that of non-segmented polymers), short chain diamines are used.

The following may be specified with reference to the other short chain diols which do not bear any unsaturated group. Notably, it may be ethylene glycol, propylene glycol, 1,4-butanediol, 1,6-hexanediol, heptanediol, neopentyl glycol, diethylene glycol, triethylene glycol, tetraethylene glycol, dipropylene glycol, a polyethylene glycol of molar mass of less than 500, ethoxylated dihydroxy bisphenol A, bis(hydroxyethyl)hydroquinone. This list is obviously not exhaustive.

The non-segmented polyurethanes or polyurethane-ureas, which are obtained with such short chain diols (and diamines), possess suitable mechanical properties which render them capable of constituting efficient photochromic coatings (more particularly, in terms of mechanical strength).

The incorporation of long chain unsaturated diols (in combination, optionally, with long chain diamines) is not however excluded from the context of this first variant. The non-segmented polyurethanes or polyurethane-ureas, which are obtained with such long chain diols, do not, per se, possess adequate mechanical properties, but their use, coated with an adequate protective coating, makes up part of the context of the invention. Hydroxyl-functionalised (at the end of the chain) polybutadiene, marketed notably by the company Aldrich (Mw 2,400 to 6,200) is cited as an example of such long chain unsaturated diols.

The expressions short chain diols and long chain diols are, in the present text, the sense which is commonly known to the persons skilled in the art in the context of synthesis of polyurethanes.

The diols, which are qualified as long chain diols, commonly have a molar mass between 500 and 10,000. Mention has been made above, with reference to the non-segmented polymers, of such an unsaturated, long chain diol. Mention will be made further on, with reference to the segmented polymers, of such polyester-type or polyether-type long chain diols.

According to a second variant, the linear polyurethanes or polyurethane-ureas in question are segmented polymers. They result from:

a classical reaction between at least one diisocyanate and at least two diols of different type, with reference to their chain length: at least one short chain diol and at least one long chain diol (polyurethanes); or a classical reaction between at least one diisocyanate, at least one diol and at least one diamine, at least two of the diol(s) and diamine(s) being of different type, with reference to their chain length (polyurethane-ureas).

The presence of such segmented linear polyurethanes or polyurethane-ureas in the cross-linkable photochromic compositions of the invention is more particularly recommended.

The short chain diol(s) (even the short chain diamine(s) which can be incorporated) will confer hardness (said short chain diamines and diols can be qualified as hard diamines and hard diols) to the final matrix (cross-linked composition obtained by cross-linking of the cross-linkable composition), whereas the long chain diol(s) and/or the long chain diamine(s) will confer flexibility to it (said long chain diamines and diols can be qualified as soft diamines and soft diols). It will be possible for very interesting compromises, with reference to the mechanical properties, to be thus attained.

In such a context of incorporation of two types of diols or of one type of diol and of one type of diamine, the unsaturated group sought after is advantageously brought about by short chain diols.

Very advantageously, said short chain diols are of formulae (I), (Ia), (Ib) or (Ib$_1$) specified above.

Long chain diols, i.e., those commonly having a molar mass between 500 and 10,000, are combined, for the synthesis of segmented polyurethanes, with such short chain diols. Said diols advantageously have a molar mass between 600 and 6,000.

Said long chain diols include, for example, polyether diols, polytetramethylene glycols, polyester diols and polycarbonate diols. These types of long chain diols are described in the "Polyurethane Handbook—2$^{nd}$ Edition— Gunter Oertel Section 2.2, page 21 and Section 3.1, pages 55-71: Raw materials/Polyols" and are perfectly known to the person skilled in the art.

The following may nevertheless be recalled while on the subject of them.

The polyester diols are obtained classically by a polycondensation reaction between dicarboxylic acids and diols of low molar mass. The following may be used as dicarboxylic acids: the three phthalic acids (isomers), tetrahydrophthalic acid, adipic acid, succinic acid. Use can also be made of an anhydride of such acids. The following may be used as low molar mass diols: ethylene glycol, propylene glycol, butanediol, hexanediol, heptanediol, diethylene glycol, triethylene glycol, tetraethylene glycol, dipropylene glycol, ethoxylated dihydroxy bisphenol A, bis(hydroxyethyl)hydroquinone. The lists given above are obviously not exhaustive.

Said polyester diols can also be obtained by polymerisation of a lactone after opening of the ring of said lactone, in the presence of an initiator, namely a diol. Examples of lactone are caprolactone, propiolactone and butyrolactone. Hydroxy-acids, such as hydroxy-caproic acid and dimethylolpropionic acid, can also be used as starting products for the preparation of such polyester diols. Such preferred polyester diols are polycaprolactone diols. They are notably marketed under the designation Interox CAPA® Polycaprolactone polyol by the company SOLVAY. Their molar mass is advantageously between 550 and 4,000. Very advantageously, it is of about 1,000.

Particular polyester diols, of the polycarbonate diols type, have been mentioned. They are obtained by polycondensation of a diol and phosgene or by transesterification of diols with carbonates, such as diphenylcarbonate.

The polyether diols notably include the numerous polyoxyalkylene polyols. These latter compounds can be prepared by condensation of an alkylene oxide and of a polyhydric initiator or of mixture of such initiators such as ethylene glycol, propylene glycol. The alkylene oxide consists for example of ethylene oxide, propylene oxide, butylene oxide. Propylene oxide and ethylene oxide are the most used oxides. In alternatively using ethylene oxide and propylene oxide, a polyether with various blocks in its chain is prepared.

Examples of polyoxyalkylene polyols are polyethylene glycol and polypropylene glycol.

Another polyether diol which can be used to the purposes of the invention is polyethoxylated polyol bisphenol A, marketed under the commercial designation Dianol® by the company AKZO.

Particular polyether diols, the polytetramethylene glycols, have been mentioned above. They are obtained by cationic polymerisation of tetrahydrofuran. They are notably marketed under the commercial designation Terathane® by the company DuPont, having molar masses of 500 to 10,000. Within the context of the invention, they are advantageously used having molar masses between 1,000 and 2,000, very advantageously having a molar mass of 1,000.

For the synthesis of segmented polyurethane-ureas, the long chain diols specified above and/or long chain diamines, are advantageously combined with such short chain diols. It has been seen above in the present text that it can notably be polyether diamines.

According to preferred variants of the invention, the segmented polymers (PU, PU-urea) are obtained:
by reaction of:
at least one short chain diol, of formula (I);
at least one polyester-type or polyether-type long chain diol;
optionally, at least one diamine (of short or long chain); and
at least one diisocyanate;

or by reaction of:
at least one short chain diol, of formula (I);
at least one long chain diamine; and
at least one diisocyanate.

The synthesis of the unsaturated, linear polyurethanes and polyurethane-ureas is carried out in a classical manner.

For said non-segmented polyurethanes or polyurethane-ureas, the two or three types of reagents in question are allowed to react: diol(s)+diisocyanate(s)+optionally, diamine(s). For said segmented polyurethanes or polyurethane-ureas, the various types of reagents in question are also allowed to react: short chain diol(s)+optionally, long chain diol(s)+optionally, diamine(s)+diisocyanate(s). The reaction can be implemented in one single step (the various types of reagents are mixed and allowed to react) or according to the technique known as pre-polymerisation, i.e., in two steps.

This second technique of synthesis of polyurethanes and polyurethane-ureas, is notably described in "Polyurethane Handbook, second edition, Gunter Oertel, p.26-27".

This second technique of synthesis is sequential and necessitates an excess of one of the (types of) reagents: diisocyanate, diol, optionally diamine. The technique enables, by a careful choice of the molar ratio of the reagents: alcohol(s), amine(s), isocyanate(s), preparing, firstly a pre-polymer which is terminated either by an isocyanate function, or by an alcohol or amine function. Secondly, said pre-polymer is allowed to react.

This second technique of synthesis is particularly interesting to implement. It enables:

polymers to be obtained which are of low distributed molecular mass and which are free from starting reagents;

the contact with isocyanate monomers during the transformation process to be prevented;

the complete reaction of polyols, of low reactivity, even in the absence of catalyst and therefore it enables the segmented structures sought after to be obtained;

similarly, even in the case of joint use of diol(s) and of diamine(s) which posses very different reactivity, it enables the segmented structures sought after to be obtained.

The synthesis of the unsaturated, linear polyurethanes or polyurethane-ureas is advantageously implemented with reagents which are incorporated in amounts such that the number of NCO functions/number of labile hydrogen functions (OH and $NH_2$) ratio be close to 1. Said ratio must advantageously be situated between 0.9 and 1.2.

The unsaturated, linear polyurethanes or polyurethane-ureas which enter into the composition of the cross-linkable photochromic compositions of the invention advantageously have a reasonable molecular weight, which is not excessive, such that the mixture to be cross-linked has a reasonable, non-excessive viscosity.

If necessary, the molecular weight of said unsaturated, linear polyurethanes or poyurethanes-ureas is controlled, or limited, during their synthesis. To this end, it is suitable to incorporate, in a controlled amount, at least one monofunctional reagent, of monoalcohol-type or mono-isocyanate-type. Such a monofuctional reagent acts as a chain terminating agent. Such a monofunctional reagent can be unsaturated or non-unsaturated. Monofunctional alcohols which can be incorporated consist of monohydroxy alkyl, cycloalkyl or aryl compounds. Esters of mono(meth)acrylic diols can also be used, such as, for example: hydroxyethyl (meth)acrylate, hydroxypropyl (meth)acrylate. Such a monofunctional reagent can be incorporated right from the start of the synthesis or during it. In fact, if said synthesis is implemented in two steps (according to the technique known as pre-polymerisation), it is imperatively incorporated during the second step.

Monofunctional isocyanates which can be used include ethyl isocyanato methacrylate, isopropenyl dimethylbenzyl isocyanate, cyclohexyl isocyanate and phenyl isocyanate.

The nature and the obtention of the unsaturated polyurethane-type or polyurethane-urea-type linear polymer has been specified above, which polymer constitutes the basic element of the cross-linkable photochromic compositions of the invention, said compositions emerging as precursors of very efficient photochromic coatings.

Said polymer can cross-link on itself in order to trap the photochromic compound(s) in the matrix resulting from its cross-linking.

According to the first variant, the cross-linkable photochromic compositions of the invention do not contain "any cross-linking partners" with said polymer.

According to a second variant, which is preferred, the photochromic compositions of the invention include at least one such "cross-linking partner". Said "cross-linking partner" advantageously consists of an unsaturated monomer, which advantageously consists of such an unsaturated monomer of (meth)acrylic-type. Such a (meth)acrylate can be mono-, di-, tri-, tetra-, penta- or hexafunctional. It advantageously consists of methyl, ethyl, butyl, ethyl-hexyl, cyclohexyl, benzyl, isobornyl, lauryl (meth)acrylates; ethylene glycol, butanediol, hexanediol, di-, tri-, tetraethylene glycol di(meth)acrylates; trimethylolpropane triacrylate, trimethylolethoxylated propane tri(meth)acrylate, pentaerythritol tri- or tetra(meth)acrylate; neopentyl glycol, polyethylene glycol, polypropylene glycol, polybutylene glycol di(meth)acrylates; and mixtures thereof.

The vinylic aromatic monomers such as styrene, alpha-methylstyrene, vinyltoluene, tertbutylstyrene, divinylbenzene and diisopropenylbenzene can also be incorporated, in the cross-linkable photochromic compositions of the invention, as cross-linking partners.

The di(meth)acrylate monomers and more particularly those of polyalkyleneglycol di(meth)acrylate-type are by far preferred as such partners. These polyalkyleneglycol di(meth)acrylates are advantageously of the formula below:

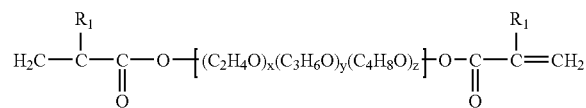

in which:
each $R_1$ is independently hydrogen or a methyl group;
x, y and z are, independently, a number between 0 and less than 15, with $3<x+y+z<15$.

The cross-linkable photochromic compositions of the invention, which are matrix precursors (said cross-linked compositions) which are particularly interesting as photochromic coatings, thus contain:
at least one unsaturated polyurethane-type or polyurethane-urea-type linear polymer;
an effective amount of at least one photochromic organic compound;
optionally, at least one unsaturated monomer.

Said unsaturated monomer(s), when it (they) is (are) used, is (are) generally present in a weight ratio:
unsaturated linear polyurethane(s) or polyurethane-urea(s)/unsaturated monomer(s), between 90:10 and 10:90.

The cross-linkable photochromic compositions of the invention are furthermore able to include an inert solvent and/or a radical polymerisation initiator and/or various additives.

The incorporation of these different types of compounds is not compulsory.

The following may be specified with reference to the solvent.

Its incorporation is excluded if the composition is manipulated in the form of a powder (powdered unsaturated, linear PU or PU-urea polymer+powdered photochromic compound); said powder being for example melted onto the substrate that it is desired to coat with the original photochromic coating of the invention.

Its incorporation (with reference to the viscosity of the composition in question) can be superfluous if said composition itself has an adequate viscosity. In fact, the unsaturated, linear polyurethane or polyurethane-urea can have said adequate viscosity or the unsaturated monomer being incorporated can play the role of solvent.

Its incorporation can be opportune, even indispensable, in certain contexts. The following may be cited in a non-exhaustive manner as potential solvent: toluene, N-methylpyrrolidone, cyclohexanone, propylene glycol methyl ether acetate, ethyl acetate, butyl acetate, methyl ethyl ketone, methyl isobutyl ketone, tetrahydrofuran, petrol distillates.

The following may be specified with reference to the radical polymerisation initiator.

Its incorporation is not necessary if the cross-linking is carried out by an electron beam.

If said cross-linking is of heat polymerisation type, of photo polymerisation type or of a heat polyrnerisation/photo polymerisation mixed type, it is necessary to incorporate at least one type of radical polymerisation initiator into the polymerisable compositions of the invention. Said initiator(s) is (are) incorporated advantageously in an effective and non-excess amount. Such an amount is generally between 0.01% and 10% by weight (more generally between 0.01% and 5% by weight) of the weight of polymer(s)+ optionally monomer(s) to be cross-linked.

The use of initiators that do not exert any harmful effect on the photochromic compounds present is privileged.

Peroxide and azobis(organonitrile) compounds, cited in the application WO-A-01 02 449, can be cited in a manner which is in no way limiting, as heat polymerisation initiators, which can be incorporated in the compositions of the invention. More particularly, the azobis(organonitrile)s are preferred and, more particularly 1,1'-azobiscyclohexane-carbonitrile, azobis(isobutyronitrile), 2,2'-azobis(2,4-dimethylpentanenitrile) and azobis(2,4-dimethylvaleronitrile).

The photoinitiators listed in the application WO-A-01 02 449 can be cited in a manner which is no way limiting as photo polymerisation initiators which can be incorporated in the compositions of the invention. More particularly, acyl oxides and bisacylphosphine oxides are preferred. Notably the photoinitiator IRGACURE 819, marketed by the company CIBA-GEIGY is preferred.

The radical polymerisation, which is implemented under the action of heat and/or of light, is done so under classical conditions, to be adapted to the nature of the polymers/monomers present.

Finally, with reference to the various additives which may be incorporated in the cross-linkable compositions of the invention, the following may be specified. They can be of various nature. Notably, they can be antioxidants, light stabilisers, adhesion promoters, surface levelling agents.

The novel cross-linkable photochromic compositions of the invention, as defined above, can generate, after cross-linking, cross-linked photochromic compositions, which constitute another object of the present invention, which, as indicated above, can constitute particularly efficient photochromic coatings of substrates, or photochromic lenses, which themselves are particularly efficient. In order to obtain such lenses, the novel cross-linkable photochromic compositions of the invention, which are free from solvent, are, classically, poured or injected into a suitable mould.

Hence, the present invention relates also to said cross-linked photochromic compositions, said substrates which are coated with such cross-linkable photochromic compositions and which are cross-linked, and said photochromic lenses which are based on said cross-linked photochromic compositions.

Such substrates can be of various types, notably of glass, of wood, of concrete, of plastic. Preferably, the substrates are of organic polymer of optical quality, notably such as substrates of polyurethane, polythiourethane, polyurethane-urea, polythiourethane-urea, polyester, polycarbonate, poly(meth)acrylate, polydiethyleneglycol bis-allylcarbonate.

When on said substrates, the cross-linkable photochromic compositions of the invention are capable of generating cross-linked photochromic coatings which are efficient, of various thicknesses and notably of high thicknesses, greater than 20 µm.

With the cross-linkable compositions of the invention, such coatings are easily optimised, in terms of thickness and of concentration of photochromic compound(s).

These coatings, and these coated substrates, can be obtained without any particular problem.

Generally, the substrates are surfaced treated so as to facilitate the adhesion, on said surface, of the coating. This type of treatment is familiar to the person skilled in the art. The surface of a polymer lens can thus be treated chemically (alkaline treatment), it can be cleaned with ultrasound, or can be subjected to plasma treatments. Also, further, and adhesive undercoat known as adhesive primer, can be incorporated onto the treated surface.

Said substrates, which are advantageously treated, are then coated with the cross-linkable photochromic compositions of the invention by implementing the conventional coating techniques, spin coating, spray coating, dip coating, and curtain coating.

Said coated substrates are then treated, thermally and/or by irradiation so as to cross-link their cross-linkable coating. They are thus obtained, coated with said cross-linked photochromic coatings.

The resistance to abrasion of such photochromic coatings, which are obtained from the original cross-linkable photochromic compositions (first object of the present invention), can be improved by the application, onto said coatings, of a hard transparent protective layer. It can notably be a protective layer, as described in U.S. Pat. No. 3,971,872. Such a protective layer can contain colouring agents and/or ultra-violet absorbers. It thus protects the coating both from mechanical aggressions and from light.

According to its last object, the present invention relates to a method of preparing the novel cross-linkable photochromic compositions, which novel compositions constitute the first object of said invention. Said method comprises mixing:

at least one polyurethane-type or polyurethane-urea-type linear polymer at least one of the moieties constituting the chain of which, which is a non-terminal moiety, comprises at least unsaturated group, advantageously of (meth)acrylic-type; with an effective amount of at least one photochromic organic compound, advantageously selected from spiroxazines, chromenes, spiropyrans fulgides and fulgimides; and optionally, with at least one unsaturated monomer, advantageously of mono-, di-, tri-, tetra-, penta-, or hexafunctional (meth)acrylate type;

optionally, with an effective amount of at least one radical polymerisation initiator; and optionally, with an effective amount of an inert solvent.

Each one of the reagents listed above is described in detail above in the present text.

The present invention is illustrated under its various aspects (cross-linkable and cross-linked photochromic compositions, obtention and use) by the Examples below.

EXAMPLES

Abbreviations Used:
HQME: Hydroquinone monomethyl ether
CR173: a photochromic compound of following formula:

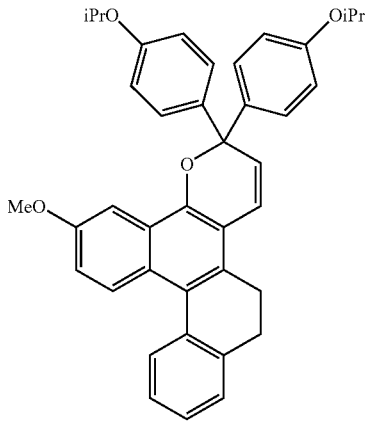

NMP: N-methylpyrrolidinone

HEMA: 2-hydroxyethyl methacrylate

BAGDA: Bisphenol A glycerolate (1 glycerol/phenol) diacrylate

Terathane® 1000: Polytetrahydrofuran linear chain polymer of Mw around 1000

PEG(550)DMA: Poly(ethylene glycol) dimethacrylate Mn around 550

PEG(875)DMA: Poly(ethylene glycol) dimethacrylate Mn around 875

BPA(40E)DMA: Ethoxylated bisphenol A dimethacrylate (4OE/phenol)

DBTL: Dibutyltin dilaurate

Desmodur W: Dicyclohexylmethane diisocyanate (Bayer)

Vazo 52 or ADVN: 2,2'-azobis(2,4-dimethyl pentanenitrile) (Akzo)

VPLS236: linear polycarbonatediol Mw 1000 (Bayer)

DPEPHA: Dipentaerythritol penta/hexa acrylate

Tinuvin 765®: a mixture of bis(1,2,6,6-pentamethyl-4-piperidyl) sebacate and methyl-1,2,6,6-pentamethyl-4-piperidyl sebacate (Ciba).

Example 1

Preparation of a cross-linkable photochromic composition of the invention (non-segmented, unsaturated PU-based, with cross-linking partner), and cross-linking of it.

Composition A:

0.2 g of HQME, 151.28 g of BAGDA and 441.62 g of PEG(875)DMA are introduced into a 1 liter glass thermostatic reactor, equipped with an agitator, a thermometer, a dropping funnel and a dry air purge. The mixture is agitated at 60° C. under nitrogen until a homogeneous solution is obtained. 10 drops of DBTL are then added.

After complete homogeneity, 81.8 g of Desmodur W are added and the resin mixture is maintained under agitation at 60° C. for 4 hours. Finally, the resin mixture obtained is cooled to ambient temperature.

Composition B:

1.52 g of CR 173 and 0.28 g of ADVN are dissolved in 8 g of N-methylpyrrolidone NMP.

Composition C:

20 g of composition A are mixed with 4.9 g of PEG(875)DMA and the composition B.

The mixture obtained is allowed to stand, at ambient temperature, to eliminate any bubbles. A CR 39 lens blank (polydiethyleneglycol bis-allyl carbonate) was hydrolysed beforehand with a solution of 15% by mass of sodium hydroxide for 15 minutes at 20° C.

The lens is coated ("spin-coating" at 2,500 rpm for 7 seconds with an acceleration of 1,000 rpm/second) of the composition C of the invention.

The coated lens is then rapidly introduced into a chamber which is equipped with a transparent window, and is submitted to a sweeping with dry nitrogen (20 liters/minute) for 3 minutes, and then exposed to an infra-red irradiation (500 W) for 6 minutes. The coating has a thickness of 40 μm.

Example 2

Preparation of a cross-linkable photochromic composition of the invention (segmented, unsaturated PU-based, without cross-linking partner) and cross-linking of it.

Composition A:

0.25 g of HQME, 61.7 g of Terathane 1000, 61.7 g of BAGDA and 166.5 g of cyclopentanone are introduced into a 1 liter glass thermostatic reactor, equipped with an agitator, a thermometer, a dropping funnel and a dry air purge. The mixture is agitated at 60° C. under nitrogen until a homogenous solution is obtained. 10 drops of DBTL are then added.

After complete homogeneity, 49.44 g of Desmodur W are added and the resin mixture is maintained under agitation at 60° C. for 4 hours. 6.63 g of CR 173 are then dissolved under agitation into the mixture. Finally, the resin mixture obtained is cooled to ambient temperature.

Composition B:

100 g of composition A are mixed with 0.72 g of cyclopent anone and 0.36 g of ADVN.

The mixture obtained is allowed to stand, at ambient temperature, to eliminate any bubbles. A CR 39 lens blank (polydiethyleneglycol bis-allyl carbonate) was hydrolysed beforehand with a solution of 15% by mass of sodium hydroxide for 15 minutes at 20° C.

The lens is coated ("spin-coating" at 1,000 rpm for 99 seconds with an acceleration of 1,000 rpm/second) of the composition B of the invention.

The coated lens is then rapidly introduced into a chamber which is equipped with a window which is transparent to infra-red, and is submitted to a sweeping with dry nitrogen (20 liters/minute) for 3 minutes, and then exposed to an infra-red irradiation (500 W) for 6 minutes. The coating has a thickness of 40 μm.

Example 3

Preparation of a cross-linkable photochromic composition of the invention (segmented, unsaturated PU-based, with cross-linking partner) and cross-linking of it.

Composition A:

0.216 g of HQME and 76.7 of NMP were introduced into a 1 liter thermostatic glass reactor equipped with an agitator, a thermometer, a dropping funnel and a dry air purge. The mixture was maintained under agitation up to the total dissolution of the compounds.

After complete dissolution, 13.28 g of HEMA, 105.9 g of BAGDA, 109.32 g of Tetrathane 1000, 90 g of PEG (550) DMA, and 10 drops of DBTL were added. The mixture was agitated at 60° C. under dry air until a homogenous solution was obtained.

After complete homogeneity, 98.46 g of Desmodur W was added over 1 hour and the resin mixture was maintained under agitation for 1 hour at 70° C. 7.66 g of CR173 are then dissolved under agitation. Agitation was continued until the removal of any solids. Finally, the resin mixture obtained was then cooled to ambient temperature.

Composition B:

0.45 g of ADVN are dissolved in 10.54 g of NMP.

Composition C:

The following materials are mixed together at ambient temperature for 1 hour:

| Products | Mass (grams) |
| --- | --- |
| Composition A | 60 |
| Composition B | 11 |

The mixture obtained is allowed to stand, at ambient temperature, so as to remove any bubbles.

A CR39 lens blank (polydiethylene glycol bis allyl carbonate) was hydrolyzed beforehand with a solution of 15% by mass of sodium hydroxide for 15 minutes at 20° C. The lens was then washed thoroughly with demineralized water prior to coating. The surface treated lens was finally coated with the composition C of the invention, by implementing the spin-coating technique at 1,500 rpm for 7 seconds with an acceleration of 1,000 rpm/second.

The coated lens is then introduced into a chamber equipped with a window which is transparent to infra-red and the chamber is subjected to a sweeping with dry nitrogen (20 l/minute) for 3 minutes, and then exposed to infra-red irradiation (500 W) for 5 minutes. The coating obtained is 40 μm thick and is insensitive to usual solvents such as ethyl alcohol, ethyl acetate, and acetone.

Example 4

The operations are identical to those described in Example 3, except that the Terathane® 1000 was replaced by an equal amount of VP LS 236.

Example 5

The operations are identical to those described in Example 4, except that the PEG(550)DMA was replaced by an equal amount of PEG(875)DMA.

Example 6

Preparation of a cross-linkable photochromic composition of the invention (segmented, unsaturated PU-based, with cross-linking partner) and cross-linking of it.

Composition A:

0.18 g of HQME and 80 g of NMP were introduced into a 1 liter thermostatic glass reactor equipped with an agitator, a thermometer, a dropping funnel and a dry nitrogen purge. The mixture was maintained under agitation up to the total dissolution of the compounds. After complete dissolution, 88.25 g of BAGDA, 91.1 g of Terathane® 1000, 75 g of PEG(875)DMA, 10.85 g HEMA and 10 drops of DBTL were added. The mixture was agitated at 60° C. under dry air until a homogeneous solution was obtained.

After complete homogeneity, 82.05 g of Desmodur W was added over 20-30 minutes and the resin mixture was maintained under agitation for 4 hours at 60° C. 5 ml of MeOH were then added 3 times; the mixture being agitated for 15 minutes between each MeOH addition. The absence of NCO was checked by infra-red (FTIR) analysis. Finally, the resin mixture obtained was cooled to ambient temperature and was stored.

Composition B:

1 g of ADVN was dissolved in 2.1 g of NMP.

Composition C:

The following materials were added in the order listed below and were mixed, at ambient temperature, until no solid remains.

| Products | Weight (grams) |
|---|---|
| CR173 | 0.639 |
| NMP | 3.68 |
| Tinuvin 765 ® | 0.695 |
| DPEPHA | 1.8 |

Composition D:

42.74 g of the composition A were added to the composition C above and were mixed thoroughly until complete homogeneity.

After complete homogeneity, 1.01 g of the composition B was added. The mixture obtained was then allowed to stand, at ambient temperature, so as to remove any bubbles.

Preparation of the Lens:

A polycarbonate lens (SOLA) coated with a protective coating of the sol-gel type was immersed into an aqueous solution of sodium hydroxide, for 45 seconds, at 45° C., and then rinsed with deionized water. The lens blank thus obtained is pre-treated by depositing on its surface an appropriate amount of adhesion promoting solution (composition E below), said deposit being carried out by the spin-coating technique.

Composition E (Adhesion Promoting Solution):

96 g of 2-butanone are mixed with 4 g of a 50% solution of N-[3-(trimethoxysilyl)propyl]polyethyleneimine hydrochloride in 2-propanol.

The pre-treated lens is coated (spin-coating at 2,500 rpm for 7 seconds with an acceleration of 1,000 rpm/second) with the composition D of the invention.

The coated lens is then rapidly introduced into a chamber equipped with a window which is transparent to infra-red, and the chamber is subjected to a sweeping with dry nitrogen (20 l/minute) for 3 minutes, and then exposed to an infra-red irradiation (500 W) for 6 minutes. The coating has a thickness of 100 µm.

Adhesion Testing

The adhesion of the coating of the invention on the lens was tested in accordance with the test method known as adhesive tape test method, according to the Standard ASTM D3359-97. Said adhesion, in accordance with said Standard, is 58 with 0% removal.

Comparative Example 1

A methacrylic coating resin composition (which is therefore not a polyurethane) was prepared by mixing the following products. The same photochromic compound is incorporated in an identical amount. The process implemented is the same.

| Products | Weight (grams) |
|---|---|
| NMP | 5.00 |
| CR173 | 2.00 |
| Vazo 52 | 0.63 |
| PEG(550)DMA | 18.5 |
| BPA(4EO)DMA | 31.52 |

The resin was applied by spin-coating at 1,500 rpm for 7 seconds on a CR39 lens prepared as in the Examples 1 to 3 of the invention.

The coated lens was cured in the way mentioned in part D, p. 37 of WO-A-01 02449.

The coating obtained is 15 µm thick.

The properties of the coatings of the invention, obtained according to the Examples above, are indicated or recalled in Table I below.

TABLE I

| Sample | % of photochromic compound in the coating (% by mass) | Coating thickness (µm) |
|---|---|---|
| Example 1 | 3.6 | 40 |
| Example 2 | 3.7 | 40 |
| Example 3 | 1.8 | 40 |
| Example 4 | 1.8 | 35 |
| Example 5 | 1.8 | 40 |
| Example 6 | 1.7 | 100 |
| Comp. Ex. 1 | 3.8 | 15 |

The photochromic properties of said coatings are given below.

Photochromic Properties Measurement

The optical transmission between 190 and 900 nm is measured for each sample in the light state (T0) and then in the dark state (TD15) after 15 minutes' exposure under a filtered xenon source (distribution near to 60% AM2) at 22° C. The light was turned off and the transmission was measured after 1, 5 and 60 minutes of fading; which transmission was noted down as TF1, TF5, and TF60, respectively. The percentage fading after 1 and 5 minutes, noted down as % recf1 and % recF5, respectively, by means of the following expressions: TD15-TF1 and TD15-TF5, respectively.

These data enable the fading rate of the photochromic article to be evaluated.

From the transmission spectra, the chromatic co-ordinates X, Y, Z were calculated according to the ASTM E308-90 method. The yellow index in the light state was calculated from these X,Y,Z co-ordinates according to the ASTM D1925-70.

The results obtained are indicated in Table II below.

TABLE II

| Sample | Yellox index | T0 | TD15 | TF1 | TF5 | TF60 | % recF1 | % recF5 |
|---|---|---|---|---|---|---|---|---|
| Example 1 | 9.0 | 89 | 16 | 33 | 58 | 68 | 17 | 42 |
| Example 2 | 8.2 | 89 | 16 | 31 | 57 | 68 | 15 | 41 |
| Example 3 | 9.5 | 88 | 18 | 31 | 53 | 66 | 13 | 35 |
| Example 4 | 7.4 | 89 | 23 | 34 | 53 | 68 | 11 | 34 |
| Example 5 | 7.5 | 89 | 20 | 32 | 54 | 66 | 12 | 34 |
| Example 6 | 10 | 88 | 14 | 29 | 56 | 65 | 15 | 42 |
| Comparative Example 1 | 7.0 | 90 | 48 | 61 | 76 | 82 | 13 | 28 |

These data indicate that, even if the concentration of photochromic compound is higher for the Comparative Example than according to the invention, 3.8 and 1.8% respectively, the transmittance to the darkened state of said Comparative Example is greater than those obtained according to the invention. The kinetic data show that the novel composition of the invention is particularly suitable in photochromic applications.

What is claimed is:

1. A cross-linkable photochromic composition, comprising:
   at least one segmented or non-segmented polyurethane-type or polyurethane-urea-type linear polymer having at least one non-terminal moiety that comprises at least one unsaturated group; and
   an effective amount of at least one photochromic organic compound to impart the desired photochromic tint to the matrix obtained by cross-linking the composition, wherein the unsaturated group of the non-terminal moiety enables the polyurethane-type or polyurethane-urea-type liner polymer to cross-link onto itself to form a matrix in which the photochromic organic compound is trapped.

2. The photochromic composition according to claim 1, wherein the at least one unsaturated group of the non-terminal moiety of the linear polymer is of (meth)acrylic-type.

3. The photochromic composition according to claim 1, wherein the at least one unsaturated group of the non-terminal moiety of the linear polymer is comprised in a pendant group.

4. The photochromic composition according to claim 1, wherein the polyurethane-type linear polymer results from a reaction between at least one diol bearing at least one unsaturated group, and at least one diisocyanate.

5. The photochromic composition according to claim 4, wherein the at least one unsaturated group of the at least one dial is a (meth)acrylic group.

6. The photochromic composition according to claim 1, wherein the polyurea-type linear polymer results from a reaction between at least one diol bearing at least one unsaturated group, at least one diisocyanate, and at least one diamine.

7. The photochromic composition according to claim 6, wherein the at least one unsaturated group of the diol is a (meth)acrylic group.

8. The photochromic composition according to claim 4, wherein the at least one diol bearing at least one unsaturated group has a formula (I) below

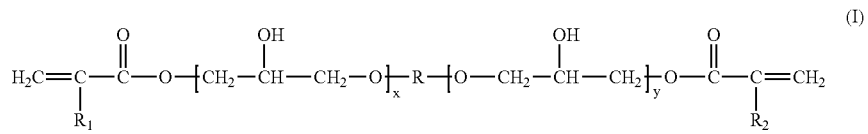

in which:
R is a bivalent linking group selected from
   $C_2$-$C_{14}$ alkylene groups,
   polyalkylerie oxide groups comprising up to 17 carbon atoms,
   phenylene groups, which are non-substituted or substituted with $C_1$-$C_9$ alkyls,

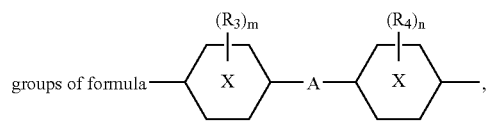

in which X is a phenylene or cyclohexyl group;
A is O, S, $SO_2$, —$CH_2$—, —$C(CH_3)_2$— or —$C(CH_3)(C_6H_5)$—; $R_3$ and $R_4$ independently represent a $C_1$-$C_4$ alkyl group, a halogen; m and n are, independently, integers from 0 to 4;
$R_1$ and $R_2$ represent, independently, hydrogen or a methyl group;
x and y are integers from 0 to 2, the sum x+y being equal to 2.

9. The photochromic composition according to claim 8, wherein when R represents

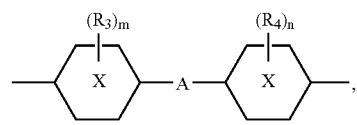

$R_3$ and $R_4$ independently represent a chlorine or bromine.

10. The photochromic composition according to claim 6, wherein the at least one diol bearing at least one unsaturated group has a formula (I) below

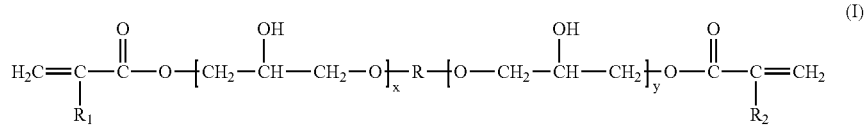

in which:
R is a bivalent linking group selected from
C2-C14 ailcylene groups,
polyalkylene oxide groups comprising up to 17 carbon atoms,
phenylene groups, which are non-substituted or substituted with $C_1$-$C_9$ alkyls,

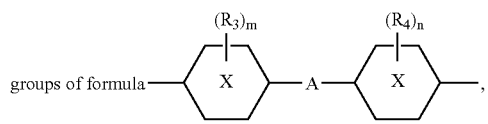

in which X is a phenylene orcyclobexyl group;
A is O, S, $SO_2$, —$CH_2$—, —$C(CH_3)_2$— or —$C(CH_3)(C_6H_5)$—; $R_3$ and $R_4$ independently represent a $C_1$-$C_4$ alkyl group, a halogen; m and n are, independently, integers from 0 to 4;
$R_1$ and $R_2$ represent, independently, hydrogen or a methyl group;
x and y are integers from 0 to 2, the sum x+y being equal to 2.

11. The photochromic composition according to claim 10, wherein when R represents

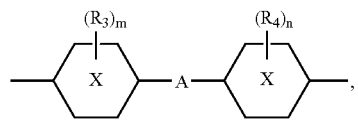

$R_3$ and $R_4$ independently represent a chlorine or bromine.

12. The photochromic composition according to claim 1, wherein the linear polymer is segmented and is obtained by
(i) a reaction between
at least one diol of formula (1) below:

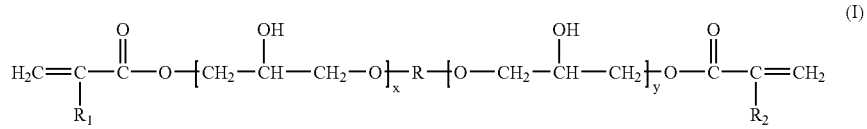

in which:
R is a bivalent linking group selected from
C2-C14 alkylene groups,
polyalkylene oxide groups comprising up to 17 carbon atoms,
phenylene groups, which are non-substituted or substituted with $C_1$-$C_9$ alkyls,

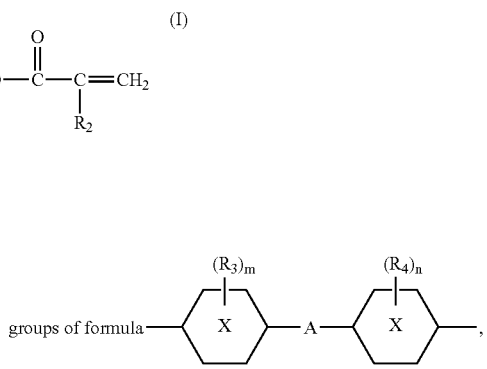

in which X is a phenylene or cyclohexyl group;
A is O, S, $SO_2$, —$CH_2$—, —$C(CH_3)_2$— or —$C(CH_3)(C_6H_5)$—; $R_3$ and $R_4$ independently represent a $C_1$-$C_4$ alkyl group, a halogen; m and n are, independently, integers from 0 to 4;
$R_1$ and $R_2$ represent, independently, hydrogen or a methyl group;
x and y are integers from 0 to 2, the sum x+y being equal to 2;
at least one long chain polyester or polyether diol;
optionally, at least one diamine; and
at least one diisocyanate;
or
(ii) a reaction between:
at least one diol of formula (I), as defined in (i) in this claim above;
at least one long chain diamine; and
at least one diisocyanate.

13. The photochromic composition according to claim 4, wherein the reaction is stopped by adding at least one monofunctional alcohol or isocyanate.

14. The photochromic composition according to claim 6, wherein the reaction is stopped by adding at least one monofunctional alcohol or isocyante.

15. The photochromic composition according to claim 1, further comprising at least one additional unsaturated monomer.

16. The photochromic composition according to claim 15, wherein the weight ratio between the unsaturated polyurethane-type or polyurea-type linear polymer and the unsaturated monomer ranges from 90/10 to 10/90.

17. A cross-linked photochromic composition obtainable by cross-linking a composition according to claim 1.

18. A photochromic lens based on a cross-linked photochromic composition according to claim 17.

19. A method of preparing a photochromic cornposition comprising mixing the following:
- at least one polyurethane-type or polyurethane-urea-type linear polymer having at least one non-terminal moiety that comprises at least one unsaturated group;
- an effective amount of at least one photochromic organic compound to impart the desired photochromic tint to the matrix obtained by cross-linking the composition, wherein the unsaturated group of the non-terminal moiety enables the polyurethane-type or polyurethane-urea-type linear volvmer to cross-link onto itself to form a matrix in which the photochromic organic compound is trapped;
- optionally, at least one additional unsaturated monomer;
- optionally, an effective amount of at least one radical polymerisation initiator; and
- optionally, an effective amount of an inert solvent.

20. A cross-linkable photochromic coating composition, comprising:
- at least one segmented or non-segmented polyurethane-type or polyurethane-urea-type linear polymer having at least one non-terminal moiety that comprises at least one unsaturated group; and
- an effective amount of at least one photochromic organic compound to impart the desired photochromic tint to the matrix obtained by cross-linking the composition, wherein the unsaturated group of the non-terminal moiety enables the polyurethane-type or polyurerhane-urea-type linear polymer to cross-link onto itself to form a matrix in which the photochromic organic compound is trapped.

* * * * *

UNITED STATES PATENT AND TRADEMARK OFFICE
CERTIFICATE OF CORRECTION

PATENT NO. : 7,261,842 B2  Page 1 of 1
APPLICATION NO. : 10/393849
DATED : August 28, 2007
INVENTOR(S) : David Henry et al.

It is certified that error appears in the above-identified patent and that said Letters Patent is hereby corrected as shown below:

| Col. | Line | Description |
|---|---|---|
| 19 | 51 | Reads "urea-type liner polymer..." should read --urea-type linear polymer....-- |
| 20 | 3 | Reads "dial is a (meth)acrylic group." should read --diol is a (meth)acrylic group.-- |
| 20 | 33 | Reads "polyalkylerie oxide groups comprising..." should read --polyalkylene oxide groups comprising...-- |
| 21 | 12 | Reads "C2-C14 ailcylene groups," should read --C2-C14 alkylene groups,-- |
| 21 | 25 | Reads "in which X is a phenylene orcyclobexyl group;" should read --in which X is a phenylene or cyclobexyl group;-- |
| 23 | 1 | Reads "A method of preparing a photochromic cornposition" should read --A method of preparing a photochromic composition-- |
| 23 | 11 | Reads "urea-type linear volvmer to cross-link onto itself to" should read --urea-type linear polymer to cross-link onto itself to-- |
| 24 | 12 | Reads "moiety enables the polyurethane-type or polyurerhane-" should read --moiety enables the polyurethane-type or polyurethane- -- |

Signed and Sealed this

Twentieth Day of November, 2007

JON W. DUDAS
*Director of the United States Patent and Trademark Office*